(12) United States Patent
Läufer et al.

(10) Patent No.: US 7,185,230 B2
(45) Date of Patent: Feb. 27, 2007

(54) METHOD FOR MONITORING A DRIVER OUTPUT

(75) Inventors: Andreas Läufer, Regensburg (DE); Konstantin Thiveos, Murnau (DE)

(73) Assignee: Siemens Aktiengesellschaft, Munich (DE)

( * ) Notice: Subject to any disclaimer, the term of this patent is extended or adjusted under 35 U.S.C. 154(b) by 482 days.

(21) Appl. No.: 10/665,186

(22) Filed: Sep. 17, 2003

(65) Prior Publication Data

US 2004/0153828 A1 Aug. 5, 2004

(30) Foreign Application Priority Data

Sep. 17, 2002 (DE) ................. 102 43 145

(51) Int. Cl.
*G06F 11/00* (2006.01)
(52) U.S. Cl. .......................... 714/25; 714/49
(58) Field of Classification Search ............. 714/5, 714/25, 49, 55, 709
See application file for complete search history.

(56) References Cited

U.S. PATENT DOCUMENTS 4,477,748 A * 10/1984 Grubbs ................ 315/306
5,999,013 A * 12/1999 Elliott ..................... 326/16
6,832,329 B2 * 12/2004 Ahrens et al. ............. 714/5
2003/0005374 A1 * 1/2003 Fought et al. ............ 714/724
2003/0140268 A1 * 7/2003 Mahoney .................. 714/4

FOREIGN PATENT DOCUMENTS

DE 2 237 925 8/1974

OTHER PUBLICATIONS

"Double Thresholding of Errors"; IBM Technical Disclosure Bulletin; vol. 32. No. 10B, Mar. 1990.
"Permanent Error Log in an Adapter Card"; IBM Technical Disclosure Bulletin; vol. 37, No. 10, Oct. 1994.

* cited by examiner

*Primary Examiner*—Scott Baderman
*Assistant Examiner*—Joshua Lohn
(74) *Attorney, Agent, or Firm*—Baker Botts L.L.P.

(57) ABSTRACT

A method for monitoring a driver output has is provision for actively influencing the driver output in order to perform fault analysis. To avoid a component addressed by the driver being influenced as a result of the active influencing of the driver output although no fault or only a sporadic fault has occurred, provision is made in accordance with the invention for active influencing of the driver output only to occur when a fault state has occurred at the driver output for a specified period of time.

20 Claims, 1 Drawing Sheet

METHOD FOR MONITORING A DRIVER OUTPUT

PRIORITY

This application claims foreign priority of the German application DE 10243145.0 filed on Sep. 19, 2002.

BACKGROUND OF THE INVENTION

The invention relates to a method for monitoring a driver output, in which there is provision for actively influencing the driver output to perform fault analysis.

Methods for monitoring driver outputs in which the fault analysis can comprise both the diagnosis of an fault occurring in or at the driver as well as the diagnosis of a component activated by the driver are known. To achieve unique diagnosis results with the known methods, it is necessary, at least in some switching states, to actively influence the driver output in such a way that a component activated by the driver is also influenced. With the known methods the components are also influenced if there are no electrical fault or only a sporadic electrical fault present.

SUMMARY OF THE INVENTION

The object underlying the invention is to develop the method in accordance with the generic model in such a way that any influencing that is not absolutely necessary of a component connected to the driver occurs less frequently.

This object can be achieved by a method for monitoring a driver output, comprising the step of influencing the driver output actively only if a fault state has occurred at the driver output for a specified period of time.

The object can also be achieved by a method for monitoring a driver output, comprising the steps of providing for actively influencing the driver output in order to perform fault analysis, and influencing the driver output actively only if a fault state has occurred at the driver output for a specified period of time.

The object can also be achieved by a method for monitoring a driver output, comprising the steps of:
performing a fault analysis of the driver;
determining whether an error occurred;
influencing the driver output actively only if an error has occurred at the driver output for a specified period of time.

The driver output can be checked cyclically for the occurrence of a fault state. The specified period of time is considered to have elapsed if the fault state has occurred at the driver output for a prespecified number of consecutive cycles. It is possible to configure the prespecified number of consecutive cycles. The fault state at the driver output can be represented by a binary value. The binary value representing the fault state at the binary output can be stored. The active influencing of the driver output may comprise application of a series of test pulses to the driver input and/or the driver output.

The method in accordance with the invention is based on the generic version of the technology in that, the driver output is only actively influenced if a fault condition has occurred for a specified period of time at the driver output. This solution makes it possible to access for the purposes of fault analysis a component connected to the driver output only when there is a long-lasting electrical fault. With a long-lasting electrical fault the fault determines the behavior of the component in many cases. If for example an electrical line is interrupted it is no longer possible to switch the component on or off. If the driver output is actively influenced in this case in order to perform a more exact fault analysis, this does not affect the component. Regardless of the specific type of a fault which exists, it makes it possible to wait for the specific period of time to avoid actively influencing the driver output if there is no fault or only a sporadic fault.

The preferred forms of embodiment of the method in accordance with the invention make provision for the driver output to be checked cyclically for the occurrence of the fault state. Cyclic checking here is taken to mean in particular processing an algorithm for detection of the fault state with a fixed repetition rate.

In this connection it is also considered to be advantageous if provision is made in accordance with the invention for the specified period of time to be seen as expired if the fault condition has occurred at the driver output for a previously defined number of consecutive cycles.

Provision can be made here for example to allow configuration of the prespecified number of consecutive cycles. The monitoring of three consecutive cycles has typically proved to be a good practical compromise between a sufficiently fast influencing of the driver output in the case of a long-lasting electrical fault and a sufficiently long period for sporadic faults to subside.

The method in accordance with the invention is advantageously developed in that the fault state is represented at the driver output by a binary value. For example the binary value can be logical "1" if there is an electrical fault and can be logical "0" if there is no electrical fault.

In this connection there is further advantageous provision for the binary value representing the fault state at the driver output to be stored. For example when provision is made for the specified period of time to be regarded as expired if the fault state has occurred at the driver for a previously specified number of consecutive cycles the binary values are preferably stored for the previously defined number of consecutive cycles. The information can be stored here in any suitable way, for example using a software-defined field or array.

With all forms of embodiment of the method in accordance with the invention there can be further provision made for the active influencing of the driver output to include application of a sequence of test pulses to the driver input and/or the driver output. In this case it is possible to incorporate the evaluation of the fault state in the test pulse generation.

BRIEF DESCRIPTION OF THE DRAWINGS

The invention will now be explained with reference to the enclosed drawing on the basis of a preferred form of embodiment.

The drawing shows:

DETAILED DESCRIPTION OF THE PREFERRED EMBODIMENTS

Figure 1:
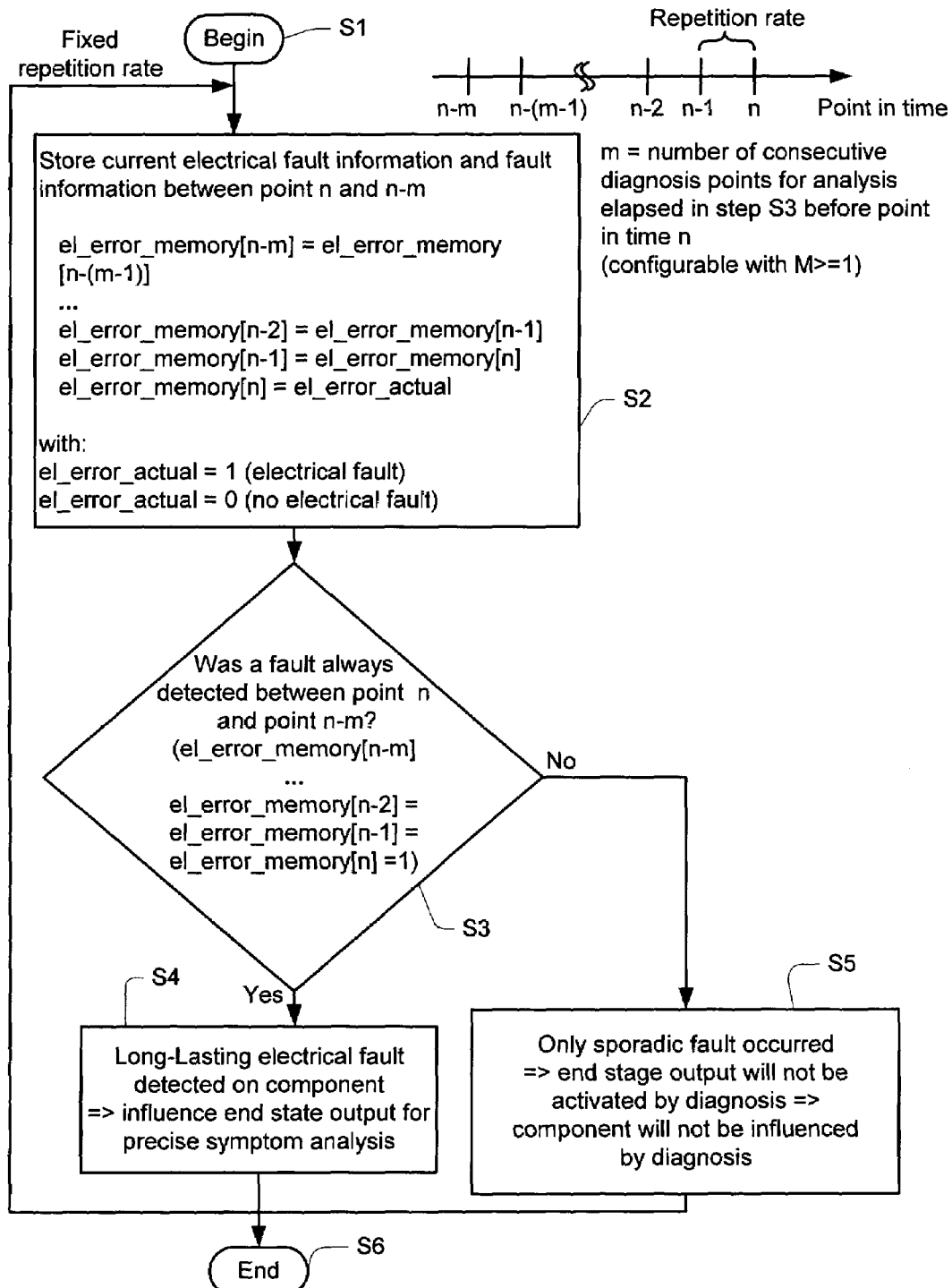
FIG. 1 a flowchart which illustrates a form of embodiment of the method in accordance with the invention.

The method illustrated in FIG. 1 involves an algorithm with which a long-lasting electrical fault can be detected, which means a fault lasting for at least the prespecified period. The method illustrated begins at Step S1.

In Step S2 the current electrical fault information and the fault information between a point in time n to n-m is stored.

In other words the specified period of time is considered to have elapsed in the form of embodiment illustrated if an electrical fault has occurred at the driver output for m+1 consecutive cycles.

In Step S3 a check is made as to whether an electrical fault was detected in the ongoing period between points n and n-m. If this is the case a branch is made to Step S4. If not, a branch is made to Step S5.

The active influencing of the driver output is undertaken in Step S4, typically by applying a series of test pulses to the driver input and/or driver output. This allows a precise analysis of symptoms or faults to be performed.

After Step S4 the algorithm shown ends at Step S6.

If it was established in Step S3 that between points n to n-m no ongoing electrical fault was detected, its is assumed in Step S5 that the fault involved was a sporadic electrical fault. The end stage or driver output is thus not actively influenced so that there is no influencing of the components addressed by the driver. Since Step S5 does not involve taking any actual action, this step is shown primarily for the purposes of explanation. Step S5 can thus be omitted if necessary.

The invention can be summarized as follows:

The invention relates to a method for monitoring a driver output, in which there is provision for actively influencing the driver output in order to perform fault analysis. To avoid a component addressed by the driver being influenced as a result of the active influencing of the driver output although no fault or only a sporadic fault has occurred, provision is made in accordance with the invention for active influencing of the driver output only to occur when a fault state has occurred at the driver output for a specified period of time.

The features of the invention published in this description, in the drawings and in the claims can be of importance both individually and in any combination for realizing the invention.

The invention claimed is:

1. Method for monitoring a driver output coupled with a component, comprising the steps of:
   providing for actively influencing the driver output in order to perform fault analysis, and
   influencing the driver output actively by applying a series of test pulses to the driver input and/or the driver output only if a fault state has occurred at the driver output for a specified period of time, wherein the fault state includes a fault of the driver or a fault of the component coupled with the driver output.

2. Method according to claim 1, wherein the driver output is checked cyclically for the occurrence of a fault state.

3. Method according to claim 2, wherein the specified period of time is considered to have elapsed if the fault state has occurred at the driver output for a prespecified number of consecutive cycles.

4. Method according to claim 3, wherein it is possible to configure the prespecified number of consecutive cycles.

5. Method according to claim 1, wherein the fault state at the driver output is represented by a binary value.

6. Method according to claim 5, wherein the binary value representing the fault state at the binary output is stored.

7. Method for monitoring an arrangement comprising a driver output coupled with a component, the method comprising the steps of:
   checking the driver output to determine an error of the arrangement and
   influencing the driver output only if a fault state has occurred at the driver output for a specified period of time.

8. Method according to claim 7, wherein the driver output is checked cyclically for the occurrence of a fault state.

9. Method according to claim 8, wherein the specified period of time is considered to have elapsed if the fault state has occurred at the driver output for a prespecifled number of consecutive cycles.

10. Method according to claim 9, wherein it is possible to configure the prespecified number of consecutive cycles.

11. Method according to claim 7, wherein the fault state at the driver output is represented by a binary value.

12. Method according to claim 11, wherein the binary value representing the fault state at the binary output is stored.

13. Method according to claim 7, wherein the active influencing of the driver output comprises application of a series of test pulses to the driver input and/or the driver output.

14. Method for monitoring a driver coupled with a component, comprising the steps of:
   performing a fault analysis by checking a driver output which is coupled with the component;
   determining whether an error of the driver coupled with the component occurred;
   applying a series of test pulses to a driver input and/or the driver output only if an error has occurred at the driver output for a specified period of time.

15. Method according to claim 14, wherein the driver output is checked cyclically for the occurrence of a error.

16. Method according to claim 15, wherein the specified period of time is considered to have elapsed if the error has occurred at the driver output for a prespecified number of consecutive cycles.

17. Method according to claim 16, wherein it is possible to configure the prespecifled number of consecutive cycles.

18. Method according to claim 14, wherein the error at the driver output is represented by a binary value.

19. Method according to claim 18, wherein the binary value representing the error at the binary output is stored.

20. Method for monitoring a driver coupled with a component, comprising the steps of:
   performing a fault analysis by checking a driver output which is coupled with the component;
   determining whether an error of the driver coupled with the component occurred;
   applying a series of test pulses to the driver output only if an error has occurred at the driver output for a specified period of time.

* * * * *